United States Patent
Marquardt et al.

(10) Patent No.: US 7,354,335 B2
(45) Date of Patent: Apr. 8, 2008

(54) CMP APPARATUS AND LOAD CUP MECHANISM

(75) Inventors: David T. Marquardt, Phoenix, AZ (US); Joe E. Koeth, Chandler, AZ (US); James Jed Crawford, Chandler, AZ (US); James Ekberg, Tempe, AZ (US); Antoni F. Jakubiec, San Jose, CA (US); Michael D. Smigel, Phoenix, AZ (US); John F. Stumpf, Phoenix, AZ (US)

(73) Assignee: Novellus Systems, Inc., San Jose, CA (US)

( * ) Notice: Subject to any disclaimer, the term of this patent is extended or adjusted under 35 U.S.C. 154(b) by 649 days.

(21) Appl. No.: 10/821,758

(22) Filed: Apr. 9, 2004

(65) Prior Publication Data
US 2005/0227595 A1    Oct. 13, 2005

(51) Int. Cl.
*B24B 49/00* (2006.01)
(52) U.S. Cl. .................. 451/11; 451/285; 451/331; 414/783; 414/936; 414/941
(58) Field of Classification Search ............. 451/10, 451/11, 285, 287, 331; 414/783, 784, 936, 414/941
See application file for complete search history.

(56) References Cited

U.S. PATENT DOCUMENTS

| | | | |
|---|---|---|---|
| 5,810,935 A * | 9/1998 | Lee et al. ................. 118/728 |
| 6,227,950 B1 * | 5/2001 | Hempel et al. ............. 451/66 |
| 6,435,941 B1 * | 8/2002 | White ......................... 451/5 |
| 2002/0048506 A1 * | 4/2002 | Babbs et al. .............. 414/783 |
| 2004/0037690 A1 * | 2/2004 | Kubo et al. ............... 414/741 |
| 2004/0185751 A1 * | 9/2004 | Nakanishi et al. ........... 451/5 |
| 2005/0159082 A1 * | 7/2005 | Sakurai et al. ............ 451/11 |

* cited by examiner

*Primary Examiner*—Eileen P. Morgan
(74) *Attorney, Agent, or Firm*—Ingrassia Fisher & Lorenz, P.C.

(57) ABSTRACT

In accordance with one embodiment of the invention, a load cup mechanism is provided for loading and unloading apparatus such as a CMP apparatus. The load cup mechanism, configured to load a work piece into and to unload a work piece from the apparatus, comprises a load cup arm configured to pivot about an axis between a load position aligned with the apparatus and an off-load position. A work piece platform is coupled to an end of the load cup arm and a plurality of lift fingers and a plurality of guide fingers, configured to support and center a work piece, are spaced about the work piece platform. A plurality of guide posts are spaced apart about the periphery of the work piece platform and are configured to align the work piece platform, in the load position, to the processing apparatus.

15 Claims, 6 Drawing Sheets

CMP APPARATUS AND LOAD CUP MECHANISM

TECHNICAL FIELD

The present invention generally relates to a mechanism for loading and unloading a processing apparatus and more specifically, in one embodiment, to a chemical mechanical planarization (CMP) apparatus and to a load cup mechanism for loading and unloading a processing apparatus such as a CMP apparatus.

BACKGROUND

Many manufacturing processes require the automated loading and unloading of work pieces into and out of a processing apparatus. In the interest of reducing cost and increasing productivity, such movement of work pieces is often accomplished with the aid of a robotically controlled load and unload mechanism.

One example of such a manufacturing process is the planarization of a surface of a work piece, a process that finds application in the manufacture of many types of products such as semiconductor wafers, optical blanks, memory disks, and the like. Chemical mechanical planarization (CMP) is one accepted method for achieving a planar surface on such work pieces. The CMP method typically requires the work piece to be loaded into and mounted precisely on a carrier head in a manner such that the surface to be planarized is exposed. The exposed side of the work piece is then held against a polishing pad and relative motion is initiated between the work piece surface and the polishing pad in the presence of a polishing slurry. Typically the work pieces are processed in batches or lots that include a plurality of work pieces. For example, with the CMP processing of semiconductor wafers, each of the wafers in a lot must be sequentially loaded from a wafer cache onto the carrier head for planarization. Following the planarization, each wafer is unloaded from the carrier head and again placed in a wafer cache or is directly transferred to a subsequent processing apparatus such as a cleaning station.

Loading a work piece into a chemical mechanical planarization apparatus presents problems for conventional work piece handling mechanisms because of the nature of the CMP carrier head. The conventional CMP carrier head includes a flexible diaphragm against which the back surface (the surface that is not to be polished) is pressed. The flexible diaphragm is surrounded by an annular wear ring or retaining ring having an inner diameter only slightly greater than the diameter of the work piece to be polished. The diaphragm and the wear ring form a cavity into which the work piece must be loaded. To carry out the planarization operation, the work piece must be mounted against the diaphragm within the confines of the wear ring. In the CMP processing of a semiconductor wafer the recess into which the semiconductor wafer must be loaded has a depth on the order of the thickness of the wafer itself, or about 0.75 mm, and the clearance between the inner diameter of the wear ring and the outer diameter of the semiconductor wafer is typically less than 1 mm.

With many work pieces, and certainly with semiconductor device wafers, the surfaces of the work pieces can be easily damaged if the surfaces are contacted during the loading and unloading processes. Because of this, the loading and unloading should preferably be done in a manner such that only the edge of the work piece or, at most, the surface within a narrow distance from the edge is contacted during the process. With the CMP processing of semiconductor wafers this requirement is made even more significant by the current migration of the semiconductor industry from 200 mm to 300 mm wafers. As part of this change, the semiconductor industry has adopted new wafer-handling standards for 300 mm wafers that preclude all contact with the major portion of the surfaces of a wafer, and has tightened limitations on the extent of the wafer that may be contacted near the wafer edge. Thus no significant contact with the front surface of the wafer is permitted and even known vacuum type end-effectors, or other end-effectors that grip or touch the back surface of the wafer are not allowed. These requirements and restrictions place serious limitations on the mechanisms used to handle the wafers. In addition, 300 mm wafers are significantly heavier than 200 mm wafers, adding still more demands on the mechanical integrity, precision, and reliability of the load and unload mechanisms.

Other types of processing apparatus in addition to CMP apparatus also require a work piece to be loaded into a recessed space with a high degree of positional accuracy and without adversely contacting the surfaces of the work piece. Although there are existing load and unload mechanisms such as robotically controlled work piece wands to address such applications, such mechanisms are costly, have difficulty with large or heavy work pieces, and require frequent maintenance and calibration to retain the necessary positional accuracy. Accordingly, it is desirable to provide an improved work piece handling mechanism that can load work pieces into and unload work pieces from a work piece processing apparatus with a high degree of precision and without adversely contacting the critical surfaces of the work piece. In addition, it is desirable to provide an improved chemical mechanical planarization (CMP) apparatus that includes a precision load and unload mechanism. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
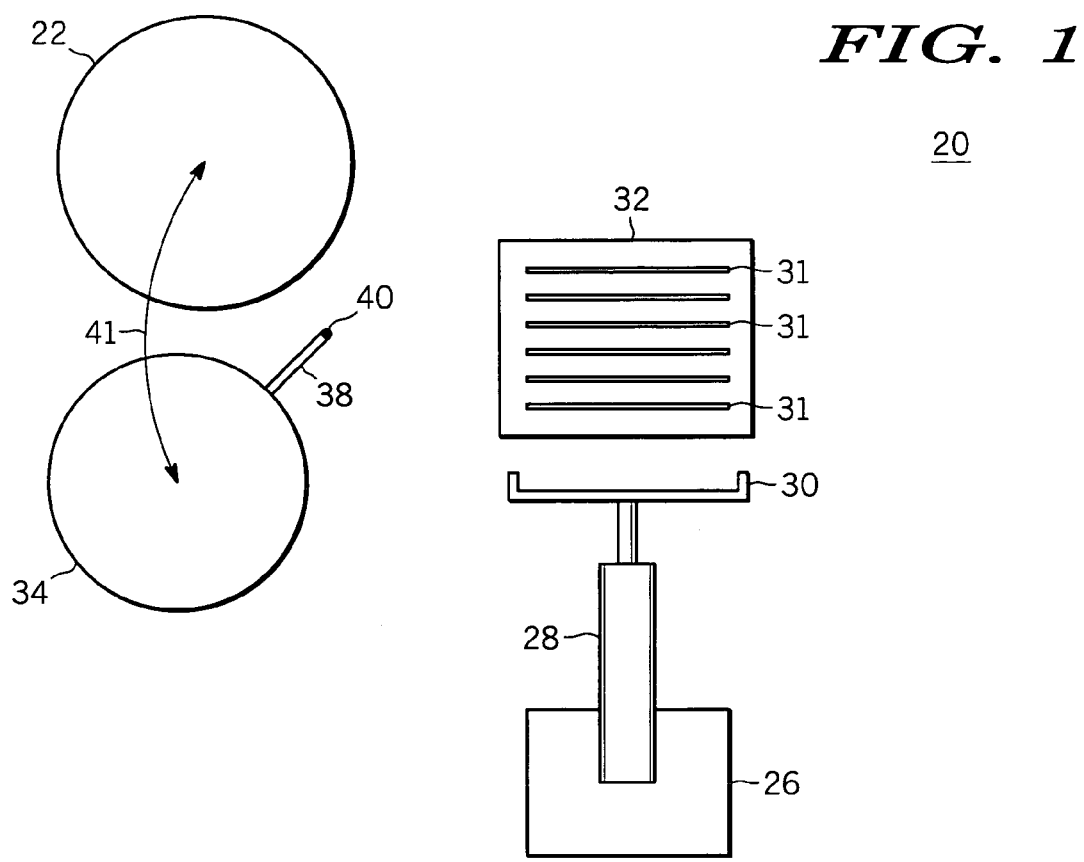
FIG. 1 illustrates schematically a multiple stage chemical mechanical planarization (CMP) apparatus in accordance with an embodiment of the invention.
Figure 1:
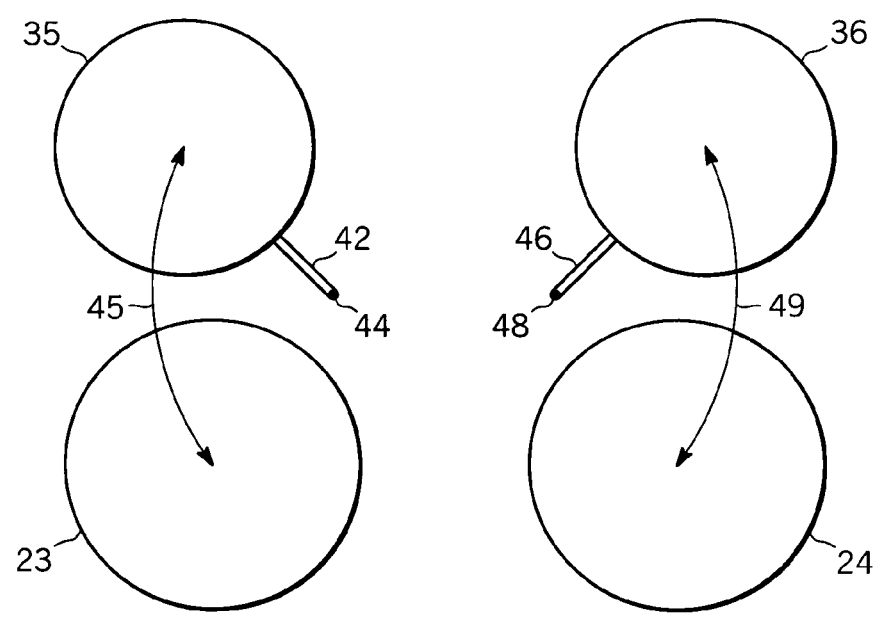

The following detailed description is merely exemplary in nature and is not intended to limit the invention or the application and uses of the invention. Furthermore, there is no intention to be bound by any expressed or implied theory presented in the preceding technical field, background, or the following detailed description.

In accordance with one embodiment of the invention, a load cup mechanism is provided that facilitates the accurate loading of an unprocessed work piece into a processing apparatus and the unloading of a processed work piece from that apparatus following a processing operation. In accordance with a further embodiment of the invention, a multi-stage chemical mechanical planarization (CMP) apparatus that includes a plurality of load cup mechanisms is provided.

The drawing figures are intended to illustrate the general manner of construction of the inventive apparatus and are not necessarily to scale. In the description and in the claims, the terms such as up, down, downward, inward, upper, lower, top, bottom, and the like may be used for descriptive purposes. However, it is understood that the embodiments of the invention described herein are capable of operation in other orientations than as shown, and the terms so used are only for the purpose of describing relative positions and are interchangeable under appropriate circumstances. The term "chemical mechanical planarization" is also often referred to in the industry as "chemical mechanical polishing," and it is intended to encompass herein both term by the use of "chemical mechanical planarization" and to represent each by the acronym "CMP." For purposes of illustration only, the invention will be described as it applies to a CMP apparatus and to a CMP process and specifically as is applies to the CMP processing of a semiconductor wafer. It is not intended, however, that the invention be limited to these illustrative embodiments; instead, the invention is applicable to a variety of processing apparatus and to the processing and handling of many types of work pieces.

FIG. 1 illustrates schematically, in top view, a multiple stage chemical mechanical planarization (CMP) apparatus 20 in accordance with one embodiment of the invention. CMP apparatus 20 includes a plurality of chemical mechanical planarization carrier heads 22, 23, 24 positioned about a centrally located work piece robot 26. The work piece robot includes an extensible arm 28 with an end-effector 30 or other implement at the end of the extensible arm. The end-effector is capable of grasping a work piece 31 and transporting it, for example, from a work piece cache 32 to one of a plurality of load cups 34, 35, 36. The load cups and the operation of the load cups will be described in detail below. Each of the CMP carrier heads is positioned over a polishing pad (not illustrated) in a manner well known to those of skill in the CMP art. Load cup 34 is coupled to a load cup arm 38 that is configured to a pivot about an axis 40 from an off-load position (as illustrated) to a load position aligned beneath carrier head 22. The path traversed by load cup 34 as it pivots about axis 40 is indicated by double headed arrow 41. In a similar manner, load cup 35 is coupled to a load cup arm 42 that is configured to pivot about an axis 44 from an off-load position to a load position aligned beneath carrier head 23. The path traversed by load cup 35 as it pivots about axis 44 is indicated by double headed arrow 45. And load cup 36 is coupled to a load cup arm 46 that is configured to pivot about an axis 48 from an off-load position to a load position aligned beneath carrier head 24. The path traversed by load cup 36 as it pivots about axis 48 is indicated by double headed arrow 49. Although three carrier heads are illustrated, CMP apparatus 20 can be configured with any number of carrier heads and with a proportionate number of load cups and associated elements.

In operation, robot 26 and end-effector 30 (or other grasping device) remove a work piece 31 from work piece cache 32 and transport it to a selected one of load cups 34, 35, 36 where it is transferred to the selected load cup. If the selected load cup is load cup 34, for example, load cup 34 then pivots on load cup arm 38 about axis 40 to a position aligned beneath carrier head 22. Once aligned beneath carrier head 22, the work piece that had been transferred from the work piece cache 32 is transferred to carrier head 22 for processing. After the transfer is completed, load cup 34 pivots on load cup arm 38 to the off-load position and work piece 31 is processed by carrier head 22 pressing the surface of the work piece against a polishing pad. The CMP process is well known and will not be described herein. After the CMP process is completed, the carrier head is raised to a position above the polishing pad, load cup 34 again pivots on load cup arm 38 about axis 40 to the load position, and the now processed work piece is transferred from the carrier head to the load cup. Load cup 34 then pivots back to the off-load position where the work piece is removed from the load cup by end-effector 30 and work piece robot 26. The work piece robot can then return the now processed work piece to the work piece cache or can transfer the work piece to another of the carrier heads for further processing or to another processing station (not illustrated).

Figure 2:
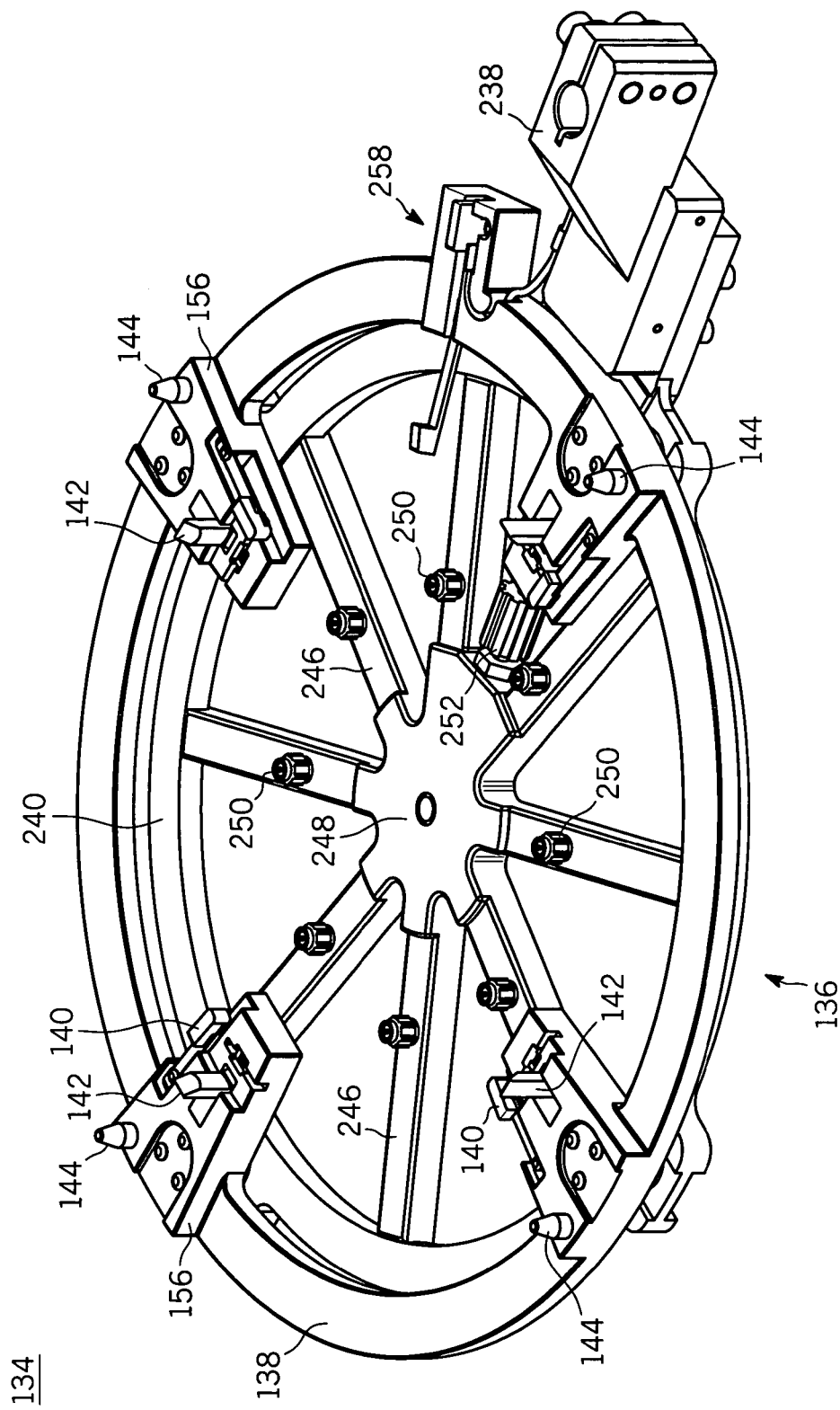
FIG. 2 illustrates, in perspective view, a load cup mechanism in accordance with another embodiment of the invention.

FIG. 2 illustrates, in perspective view, a load cup mechanism 134 in accordance with a further embodiment of the invention. Load cup mechanism 134 finds application, for example, in a multiple stage CMP apparatus 20 as illustrated in FIG. 1. Various elements of a load cup in accordance with one embodiment are more clearly seen in FIG. 3. Load cup 134 includes a work piece platform 136 which, in a preferred embodiment includes a substantially planar peripheral load ring 138 to which are coupled a plurality of spaced apart lift fingers 140 and a plurality of spaced apart guide fingers 142. Load cup 134 also includes a plurality of spaced apart guide posts 144. In accordance with this embodiment, load cup 134 includes four lift fingers, four guide fingers, and four guide posts, but a greater or lesser number could also be used depending on the particular application.

Lift fingers 140 are designed to support a work piece such as a semiconductor wafer in a position above the plane of peripheral load ring 138. The lift fingers are positioned about the peripheral load ring along a circular path having a diameter slightly less than the diameter of the work piece to be handled by the load cup. For example, for a 300 mm diameter semiconductor wafer, the lift fingers are positioned along a circular path having a diameter of about 298 mm so that they contact only the outer 1 mm of the wafer. The lift fingers preferably have an upper surface 146 that slopes downwardly and inwardly with respect to the circumference of the peripheral load ring. The downwardly sloping surface of the lift fingers helps to insure that even if a work piece is initially misaligned with respect to the load cup mechanism, only the near peripheral edge of the work piece is contacted. Lift finger 140 is preferably coupled to the peripheral load ring by a leaf spring 149 that provides a "soft landing" for a work piece transferred to the load cup.

Guide fingers 142 act to position, preferably to center, a work piece on the load cup mechanism. The plurality of guide fingers are positioned about the peripheral load ring along a circular path having a diameter slightly greater than the diameter of the work piece to be handled by the load cup mechanism. For example, if the work piece is a 300 mm semiconductor wafer, the vertical surfaces 148 of the guide fingers can be placed along a circular path having a diameter of about 300.6 mm. As a work piece is transferred to the load cup mechanism, it is captured by vertical surfaces 148 of the guide fingers. If a work piece is slightly off center as it is transferred to the load cup mechanism, beveled edges 150 of the guide fingers guide the work piece to a centered position defined by vertical surfaces 148. A work piece transferred to load cup mechanism 134 thus rests with its peripheral edge supported on lift fingers 140 and centered by vertical surfaces 148 of guide fingers 142. Beveled surfaces 150 also serve an additional purpose as will be explained below. For reasons also explained below, guide finger 142 is preferably configured to pivot about a pin (not illustrated) to a recessed position. The pivot pin passes through holes formed in guide finger 142 and is retained in load/unload block 156 by a bracket or other mechanism which can be attached to the load/unload block. Guide finger 142 is biased to an upright position by a torsion spring 155 positioned about the pivot pin and captured by the load/unload block. Load/unload blocks 156 are coupled to peripheral load ring 138.

Guide posts 144 are also coupled to peripheral load ring 138. The guide posts serve to align the load cup mechanism to the processing apparatus such as a CMP carrier head as will be explained more fully below. Preferably one each of a guide post 144, lift finger 140, and guide finger 142 are positioned in proximity to each other. Preferably one each of the guide post, lift finger and guide finger are coupled together by a load/unload block 156 which, in turn, can be coupled to the peripheral load ring. The load/unload block can be coupled to the peripheral load ring, for example, by screw fasteners or the like.

Figure 3:
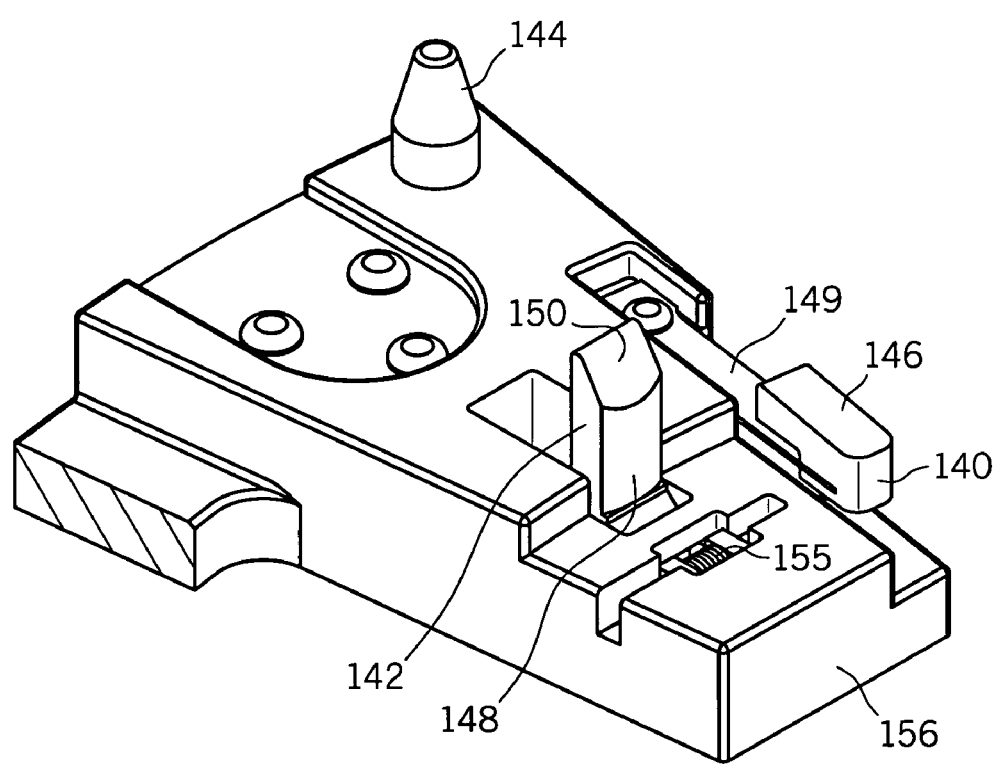
FIGS. 3 illustrates, in perspective view, load and unload elements of a load cup mechanism in accordance with one embodiment of the invention.
Figure 4:
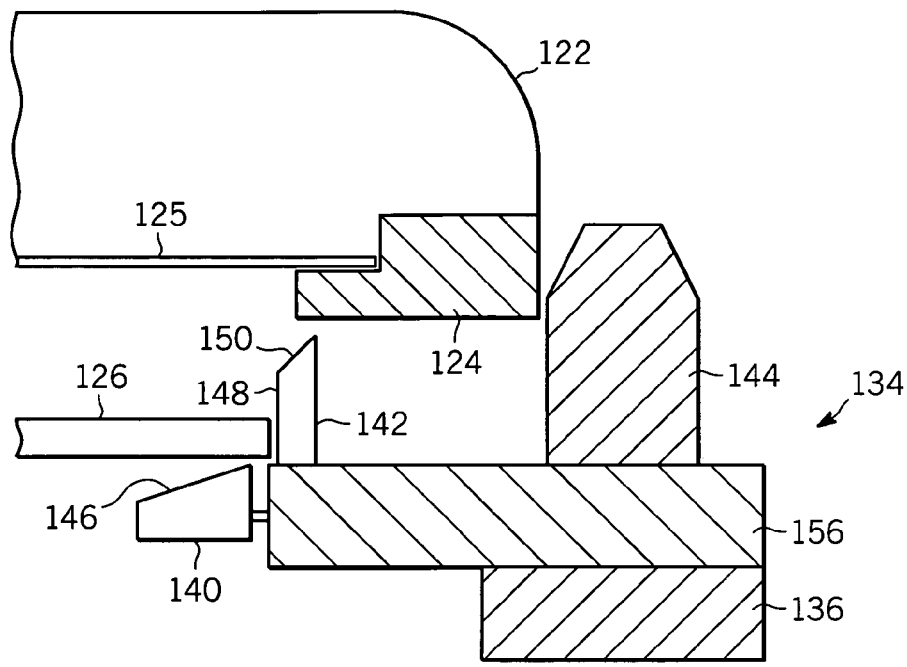
FIGS. 4 and 5 schematically illustrate, in cross section, operation of the load and unload elements of a load cup mechanism in accordance with an embodiment of the invention.
Figure 5:
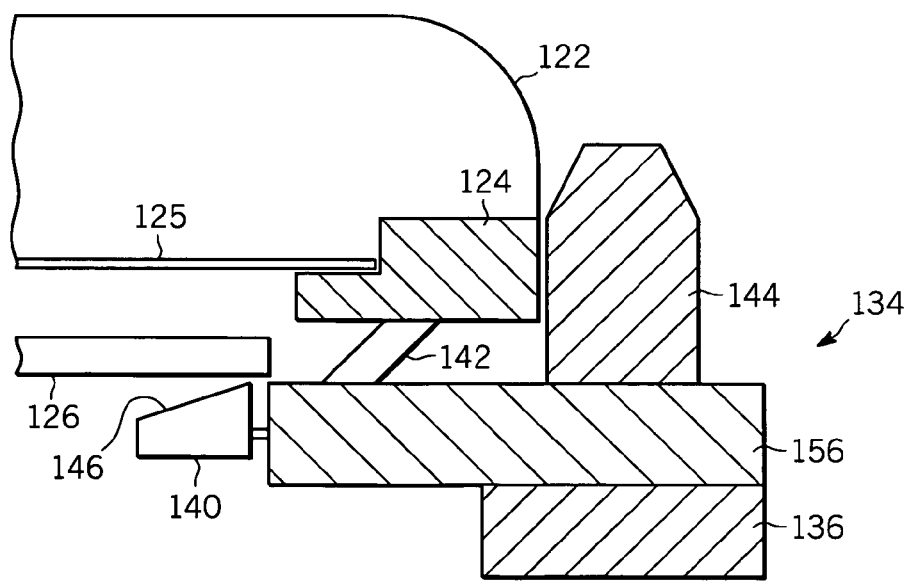

FIGS. 4 and 5 schematically illustrate, in cross section, operation of the load and unload elements of load cup mechanism 134 in accordance with an embodiment of the invention. FIGS. 4 and 5, which should be considered together with FIGS. 1-3, illustrate a portion of load cup mechanism 134 and its interaction with a processing apparatus and specifically its interaction with a carrier head 122 of a CMP apparatus as a work piece such as a semiconductor wafer 126 is loaded into the apparatus. Carrier head 122, a portion of which is illustrated, includes a wear ring 124 and a diaphragm 125. The diaphragm and wear ring form a recess into which a work piece such as a semiconductor wafer 126 must be inserted for processing. In the process of loading semiconductor wafer 126 into the recess in carrier head, the wafer is first transferred from a wafer cache to load cup mechanism 134. The wafer may be transferred from the wafer cache to the load cup mechanism by an end-effector 30 or other grasping mechanism secured to the end of an extensible robot arm 28. The robot and the end-effector transfer the wafer, process side down, to a load cup mechanism 134 that is pivoted to the off-load position. By "process side down" is meant that the side of the wafer that is to be planarized is down. The outer periphery of wafer 126 rests on surface 146 of lift fingers 140 and is centered on the load cup mechanism by vertical surfaces 148 of guide fingers 142. Load cup mechanism 134 is then pivoted to the load position roughly aligned beneath carrier head 122. The load cup mechanism is then raised vertically toward the carrier head so that guide posts 144 contact the edge of wear ring 124 or other alignment key on the carrier head. The interaction of the guide posts with the wear ring or other alignment key precisely aligns the load cup mechanism and the wafer it carries with respect to the recess in the carrier head as illustrated in FIG. 4. The ends of guide posts 144 are preferably chamfered to assist in the alignment. During the movement of the load cup mechanism, the guide fingers, touching only the edge of the wafer, maintain the wafer positioned on the lift fingers of the load cup mechanism.

After load cup mechanism 134 and wafer 126 are aligned with carrier head 122, the load cup mechanism is further raised toward the carrier head. As the load cup mechanism is raised, the beveled ends 150 of guide fingers 142 contact the bottom surface of wear ring 124 and this contact with the beveled surface begins to cause the guide fingers to pivot about pivot pin 152 away from wafer 126 as illustrated in FIG. 5. Although not illustrated, the load cup mechanism continues to lift the wafer toward the recess in carrier head 122, and as the load cup mechanism and wafer get closer to the carrier head, the guide fingers continue to pivot away from the wafer. The load cup mechanism thus continues to lift the wafer until it is secured within the recess in the carrier head. The load cup mechanism is then lowered to a plane beneath carrier head 122 and is pivoted to the off-load position. Processing of the wafer can then proceed in the normal manner. In the normal processing of wafer 126 the carrier head is lowered to place the lower or process side of the wafer in contact with a polishing pad and the CMP process is carried out.

Following the CMP process, the load process is reversed to unload the now processed wafer from the carrier head. -The load cup mechanism is pivoted from the off-load position to the load position under the carrier head. Load cup mechanism 134 is raised so that guide posts 144 align the load cup mechanism with the recess in carrier 122. The load cup mechanism is raised further to cause guide fingers 142 to contact the lower surface of wear ring 124 and to pivot away from the recess. The now processed wafer is discharged from the recess in the carrier head and is supported on surfaces 146 of lift fingers 140 of load cup mechanism 134. The load cup mechanism is lowered away from the carrier head and as the load cup mechanism is lowered, torsion springs 155 causes guide fingers 142 to pivot to a position centering wafer 126 on the load cup mechanism between surfaces 148 of the plurality of guide pins. The load cup mechanism is lowered further out of contact with the carrier head and then is pivoted to the off-load position. During this movement of the load cup mechanism, the guide fingers again maintain wafer 126 positioned on the lift fingers of the load cup mechanism. From the off-load position the now processed wafer can be removed from the load cup mechanism by the end-effector and work piece robot and can be returned to the wafer cache or can be moved to another process station or to another load cup mechanism associated with another carrier head.

Referring again to FIG. 2, there is illustrated a further embodiment of the invention. As illustrated, load cup arm 238 is coupled to a support ring 240. Support ring 240, in turn, is coupled to and supports peripheral load ring 138. In a preferred embodiment, a plurality of radial spokes 246 are coupled at one end to support ring 240 and at the opposite end to a central hub 248. During the processing of some work pieces, and specifically during the CMP processing of semiconductor wafers, it is desirable to maintain the surface of the wafer in a hydrophilic state because in that state the wafer is less susceptible to contamination. A semiconductor wafer that has just undergone CMP processing is generally hydrophilic, but rapidly becomes hydrophobic upon exposure to air. Accordingly, it is desirable to spray a fluid such as water or other liquid, especially a liquid containing a surfactant, onto the wafer surface before that surface becomes hydrophobic. In other applications, it is desirable for this or other reasons to maintain the surface of the work piece wetted with a fluid. In accordance with another embodiment of the invention the load cup mechanism is provided with a plurality of fluid spray nozzles 250 from which a fluid can be sprayed onto the surface of the work piece before and/or after processing. In accordance with one embodiment of the invention, the fluid spray nozzles are positioned on radial spokes 246 and the spokes are configured as a spray manifold for conveying fluid to spray nozzles 250. A fluid coupling 252 can be fitted to the spray manifold through which fluid can be brought from a fluid reservoir and tubing (not illustrated) to the manifold.

Figure 6:
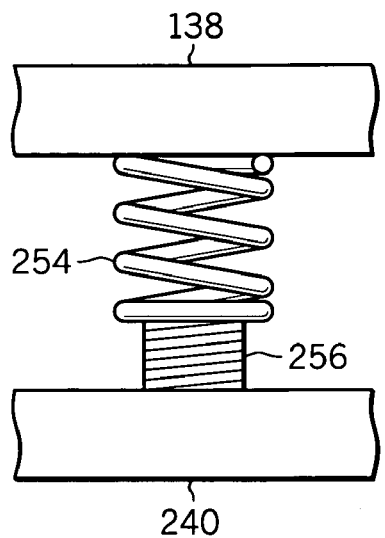
FIG. 6 illustrates, in cross sectional view, a portion of a load cup mechanism in accordance with a further embodiment of the invention.

FIG. 6 illustrates, in a cross section of a portion of a load cup mechanism, a preferred embodiment of the invention for coupling support ring 240 and peripheral load ring 138. It is desirable that the peripheral load ring be aligned with the carrier head and in a plane parallel to the wear ring and diaphragm of the carrier head when the load cup mechanism is in the load position. In accordance with this embodiment of the invention a plurality of springs 254 are positioned between the support ring and the peripheral load ring. The springs can be attached at one end to either the support ring or to the peripheral load ring with a screw or other fastener. In FIG. 6 this attachment has been illustrated as being to the peripheral load ring. The other end of the spring can be attached to the other of the support ring or peripheral load ring with a threaded stud 256 that is integral with an end of the spring. The spacing between the support ring and the peripheral load ring can be adjusted by adjusting the distance the threaded stud is turned into the support ring. By so adjusting each of the plurality of springs, the plane of the peripheral load ring can be adjusted to keep it parallel to the plane of the wear ring. In addition to providing a height adjustment and an adjustment to the plane of peripheral load ring 138, springs 254 allow for a lateral adjustment within the plane of the peripheral load ring as the load cup mechanism is aligned with processing apparatus such as a carrier head of a CMP apparatus. As guide posts 144 coupled to peripheral load ring 138 contact the wear ring or other alignment key of the carrier head, springs 254 allow the load cup mechanism to move in the plane defined by the peripheral load ring to align the semiconductor wafer or other work piece to be aligned with the recess in the bottom of the carrier head.

Figure 7:
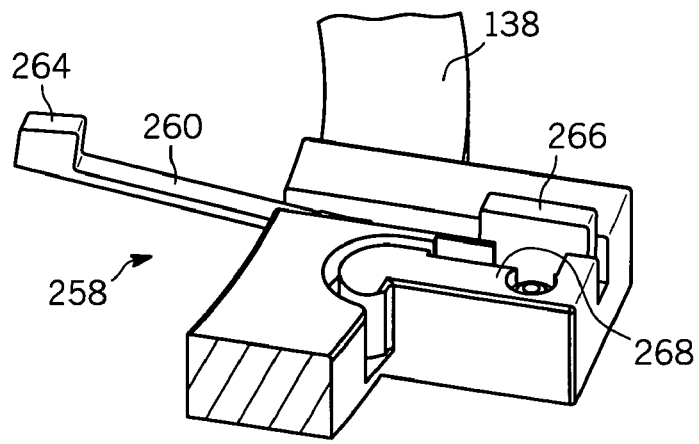
FIG. 7 illustrates, in perspective view, work piece sense elements of a load cup mechanism in accordance with yet another embodiment of the invention.

FIG. 7 illustrates, in perspective view, when considered together with FIG. 2, a work piece gravity sensor 258 in accordance with a further embodiment of the invention. Work piece gravity sensor 258 is preferably coupled to peripheral load ring 138 and is configured to detect the presence of a work piece such as a semiconductor wafer positioned on the load cup mechanism. Work piece gravity sensor 258 includes a work piece sense finger 260 which is constrained to pivot about a pivot point within the sensor. The pivot point can be, for example, a pivot pin that passes through a bore formed in the work piece sense finger. At one extremity of the work piece sense finger is a work piece contact 264. At the opposite extremity of the work piece sense finger is a sensor target 266. The pivot point is positioned relative to the center of gravity of the work piece sense finger such that in the absence of a work piece on the load cup mechanism, the sense finger is biased with the work piece contact 264 in the "up" position. When a work piece such as a semiconductor wafer is placed on the load cup mechanism, the work piece contacts work piece contact 264, moving the work piece contact to a "down" position and causing the sense finger to pivot about the pivot point. The work piece sensor also includes a magnetic, inductive, or other type of sensor 268 positioned proximate the extremity of the work piece sense finger that includes sensor target 266. As the work piece contact moves from the "up" position when no work piece is present to the "down" position when a work piece is present, sensor target 266 moves relative to sensor 268 causing a sensor signal to be generated.

Figure 8:
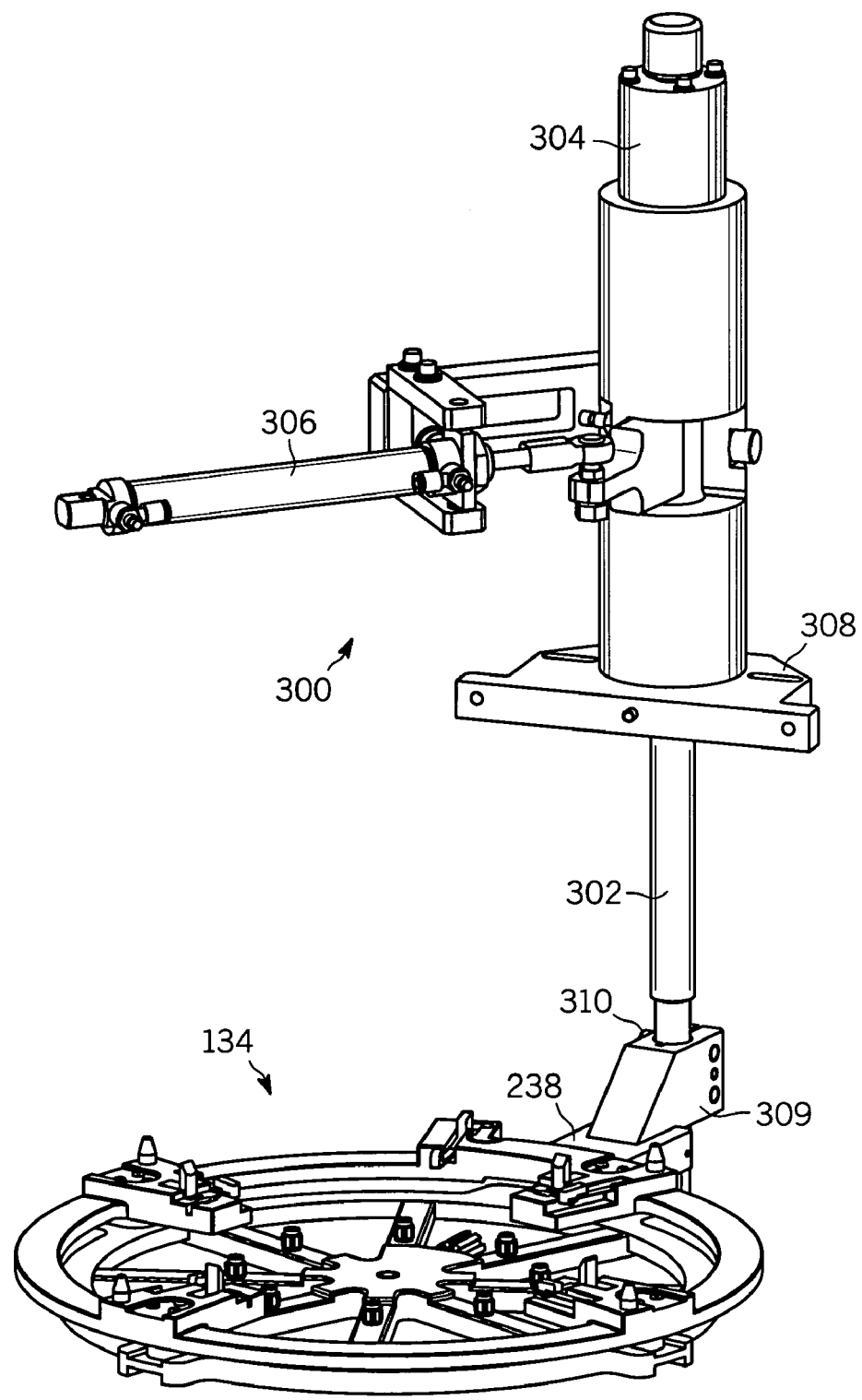
FIG. 8 schematically illustrates, in perspective view, a load cup arm and pivot mechanism in accordance with one embodiment of the invention.

FIG. 8 schematically illustrates, in perspective view, a load cup 134, load cup arm 238, and pivot mechanism 300 in accordance with one embodiment of the invention. Pivot mechanism 300 includes a shaft 302 about which load cup 134 can pivot from an off-load position to a load position. Shaft 302 is coupled to and moves up and down in response to an up/down air cylinder 304. Shaft 302 is also coupled to and rotates in response to an in/out air cylinder 306. The motion of shaft 302 is relative to a coupling 308 which is fixed relative to the position of the related carrier head. The up or down motion and the rotational motion of shaft 302 causes load cup 134 and an associated work piece positioned thereon to move up and down with respect to a processing apparatus and to pivot between a load and an off-load position. Load cup arm 238 can be coupled to shaft 302, for example, by a clamp 309 that tightens when torque is applied to threaded fasteners 310 or other similar fasteners. The clamp provides an adjustment point for initial set up adjustment in both height and angular position of the load cup. Once tightened, the clamp acts as a rigid connection between the load cup arm and the shaft. Computer controls can be used to activate the two air cylinders to move the load cup at the desired time. Other mechanisms such as servo motors or the like could also be used to move and activate shaft 3 02 and hence the load cup and the work piece carried by the load cup.

While at least one exemplary embodiment has been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A load cup mechanism configured to load a work piece having a periphery into a processing apparatus and to unload a work piece from the processing apparatus, the load cup mechanism comprising:

a load cup arm configured to pivot about an axis between a load position aligned with the processing apparatus and an off-load position;

a work piece platform coupled to an end of the load cup arm;

a plurality of lift fingers spaced about the work piece platform and configured to support a work piece near the periphery of the work piece; and a plurality of guide fingers spaced about the work piece platform and configured to center the work piece on the work piece platform.

2. The load cup mechanism of claim 1 further comprising a plurality of guide posts spaced apart about the periphery of the work piece platform and configured to align the work piece platform in the load position to the processing apparatus.

3. The load cup mechanism of claim 1 wherein the work piece platform comprises;

a substantially planar peripheral load ring having an upper surface substantially lying in a peripheral load ring plane; and the plurality of lift fingers are coupled to the peripheral load ring.

4. The load cup mechanism of claim 3 wherein the plurality of guide fingers are coupled to the peripheral load ring.

5. The load cup mechanism of claim 3 further comprising a support ring coupled to the end of the load cup arm and configured to support the peripheral load ring.

6. The load cup mechanism of claim 5 wherein the support ring comprises:

a peripheral support ring coupled to the load cup arm;

a plurality of radial spokes each coupled at a first end to the peripheral support ring; and a hub coupled to a second end of each of the plurality of radial spokes.

7. The load cup mechanism of claim 6 further comprising a plurality of spray nozzles configured to spray a fluid onto a surface of the work piece.

8. The load cup mechanism of claim 7 wherein each of the plurality of spray nozzles is coupled to one of the plurality of spokes and wherein the plurality of spokes are configured as a spray manifold for supplying fluid to the spray nozzles.

9. The load cup mechanism of claim 6 further comprising a plurality of springs positioned between the peripheral support ring and the peripheral load ring.

10. The load cup mechanism of claim 9 wherein the plurality of springs comprise a height adjustment configured to adjust the height of the peripheral load ring and to adjust the peripheral load ring plane relative to the processing apparatus.

11. The load cup mechanism of claim 1 further comprising a plurality of spray nozzles configured to spray a fluid onto a surface of the work piece.

12. The load cup mechanism of claim 1 further comprising a gravity sensor configured to indicate the presence of a work piece positioned on the plurality of lift fingers.

13. The load cup mechanism of claim 1 wherein the plurality of guide fingers are configured to contact an edge of the work piece as the load cup arm is pivoted from the off-load position to the load position.

14. The load cup mechanism of claim 13 wherein the plurality of guide fingers are configured to pivot to a position out of contact with the work piece when the work piece is loaded into the processing apparatus.

15. A processing apparatus for processing a work piece comprising:

a processing head configured to process a work piece;

a load cup mechanism configured to pivot from an off-load position to a load position to load a work piece into the processing head for processing, the load cup mechanism comprising a plurality of lift fingers to support a work piece by its near peripheral edge and said load cup mechanism further comprising a plurality of guide fingers to position the work piece on the load cup mechanism.

* * * * *